United States Patent [19]

Hecker et al.

[11] Patent Number: 4,751,970
[45] Date of Patent: Jun. 21, 1988

[54] ANGULAR ATTACHMENT FOR TRANSMITTING AND DEVIATING OUTPUT POWER OF A MACHINE

[75] Inventors: Roland Hecker, Leinfelden; Helmut Kapfer, Leinfelden-Echterdingen; Ludwig Thome, Leinfelden-Stetten, all of Fed. Rep. of Germany

[73] Assignee: Robert Bosch GmbH, Stuttgart, Fed. Rep. of Germany

[21] Appl. No.: 792,827

[22] Filed: Oct. 28, 1985

[51] Int. Cl.$^4$ .............................................. B25D 16/00
[52] U.S. Cl. .................................... 173/104; 173/122; 173/126; 74/110; 74/22 R
[58] Field of Search .......... 173/163, 104, 29, 101–102, 173/109, 122, 47, 48, 46, 126; 81/57.13, 57.29; 74/110, 22 R; 72/452

[56] References Cited

U.S. PATENT DOCUMENTS

| 1,819,777 | 8/1931 | Holden | 72/452 |
|---|---|---|---|
| 2,301,889 | 11/1942 | Lear | 173/131 |
| 2,457,565 | 12/1948 | Kott | 173/109 |
| 2,946,315 | 7/1960 | Doeden | 173/163 |
| 3,038,360 | 6/1962 | Mormann | 72/452 |
| 3,270,593 | 9/1966 | Kaman | 81/464 |
| 3,396,572 | 8/1968 | Godsey | 173/121 |
| 3,719,254 | 3/1973 | Snider | 173/163 |
| 4,173,828 | 11/1979 | Lustig et al. | 173/29 |
| 4,184,795 | 1/1980 | Medlin | 408/127 |
| 4,442,906 | 4/1984 | Simpson | 173/48 |

FOREIGN PATENT DOCUMENTS

544567 4/1942 United Kingdom .
2011568 7/1979 United Kingdom .

Primary Examiner—E. R. Kazenske
Assistant Examiner—James L. Wolfe
Attorney, Agent, or Firm—Michael J. Striker

[57] ABSTRACT

An angular attachment to a rotary and percussive power machine, such as a hammer drill, includes a rotary power input tubular member driven by a rotary part of the power machine, a tubular power output supported for rotation at an angle relative to the axis of rotation of the power input member and including a holder for a rotary and percussive work tool. The tubular power input and output members are interconnected by an intermediate power transmission. A device for transmitting impacts from the percussive part of the power machine includes two guiding channels arranged in alignment with central bores of the tubular power input and output members and each enclosing at least one impact deviating element. The impact deviating elements are in sliding engagement with each other and with a corresponding coupling member arranged in respective contact bores of the power input and output members.

10 Claims, 9 Drawing Sheets

ANGULAR ATTACHMENT FOR TRANSMITTING AND DEVIATING OUTPUT POWER OF A MACHINE

BACKGROUND OF THE INVENTION

The present invention relates to an angular attachment for transmitting and deviating output power of a rotary and percussive power machine, such as a percussive drilling machine or hammer drill.

The angular attachments of this kind serve for adjusting the power machine for the operation in narrow spaces such as drilling in wall nitches or recesses or in wall shafts, sloping walls, cutouts in the walls, because the angular attachment considerably reduces the operational length of the machine.

Prior art angular attachments of this kind include an intermediate transmission formed by beveled gears for transmitting only the rotary movement of the driving power machine to the work tool mounted at the output of the angular attachment. The axial strokes of the power machine in this case cannot be transferred to the tool. Accordingly, the prior art angular attachment is applicable only for work with materials suitable rotary percussive operation in hard and brittle materials such as concrete, and are of course unusable for those operations in which exclusively the axial striking movement is needed for example during chiseling or riveting.

SUMMARY OF THE INVENTION

A general object of this invention is to overcome the aforementioned disadvantage.

In particular, it is an object of this invention to to provide an angular attachment by means of which it is possible to transmit both the rotary and the translatory movement of a hammer drill to the work tool oriented at a different angle at the output of the attachment.

Another object of this invention is to transfer this combined movement either immediately or by means of coupling elements arranged in the power machine or in the angular attachment itself.

In keeping with these objects and others which will become apparent hereafter, one feature of the invention resides, in an angular attachment for use in connection with rotary and percussive power machines having a rotary driving member which is coupled with an axially movable striking member in a combination which comprises a rotary power input member arranged for rotation about a first axis and being coupled to the rotary driving member, the power input member being formed with an axial input bore aligned with the path of movement of the striking member, a rotary power output member arranged for rotation about a second axis forming an angle with the first axis, the power output member having an axial output bore for receiving a work tool, an intermediate power transmission arranged between the rotary input and output members, the power transmission including means for transmitting rotary movement from the input member to the output member and a device for transmitting impacts from the striking member to the work tool, the transmitting device including a curved track arranged between the input and output axial bores, and at least one impact transmitting element guided in the curved track to engag both the striking member and the work tool.

The angular attachment according to this invention has the advantage that it utilizes both the rotary and the percussive power of the driving power machine, whereby only the unavoidable losses during the transmission limit the deviatad power output.

In a preferred embodiment of this invention the impact transmitting device includes a succession of balls or rolls from hardened steel shiftable in the curved track and partially entering the input and output axial bores. The advantage of this embodiment is an inexpensive manufacture and the possibility to use relatively high drilling speeds. The balls or rolls are preferably made if hardened steel in a mass production process which is cost advantageous. In addition, the balls or rolls can be replaced without problems, if necessary. Of all component parts of the impact transmitting device, the balls or rolls are subjected to strongest wear. By exchanging the impact transmitting elements at regular intervals, the service life of the angular attachment can be substantially increased.

In another preferred embodiment of this invention, the balls or rolls are combined with an elbow plunger arranged in the curved track. The advantage of this modification is an improved flow of energy during the percussive power transmission. On the other hand, the elbow shaped plunger causes substantially higher transmission losses due to increased friction and inertial forces when compared to balls or rolls.

In still another embodiment of this invention, the impact transmitting element is in the form of a pendulum pivotable about a fixed point and having adjoining sides which engage the striking member and the work tool. The pivot point and the point of contact between the sides of the pendulum and the tool and the striking member represent different levers. By adjusting the leverage it is possible to obtain an increased stroke or the transmission of an increased impact force to the tool.

In still another embodiment of this invention, the impact transmitting device includes a rectangular guiding track whose branches are aligned with the axial bores of the input and output axial bores, and the impact transmitting elements being assembled of two sliders slidably engaging each other along an inclined plane intersecting the corners of the angular track whereby the opposite ends of respective sliders engage the striking member and the work tool. This modification has also the advantage that the transmission ratio can be adjusted by selecting different areas of the sliding contact surfaces. The transverse cross-section of the two sliders can be of arbitary shape, for example round or rectangular.

In a modification of the preceding embodiment, the impact transmitting device includes sliding elements guided in respective branches or channels of the angular track and being coupled to the striking member and to the work tool, the impact transmitting elements having conical shape, the base of one con being secured to the sliding element coupled to the striking member whereas the other conical element secured to the other sliding member is rotatable together with the output member. Due to the alternating sliding contact between the conical jackets of the impact transmitting elements it is achieved that the impact forces act on alternating contact lines and consequently the service life of the transmission device is increased.

In still another embodiment of this invention, the compact transmitting device operates on the principle of a hydraulic press and also enables the adjustment of the transmitted stroke or the ratio of the transmitted forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
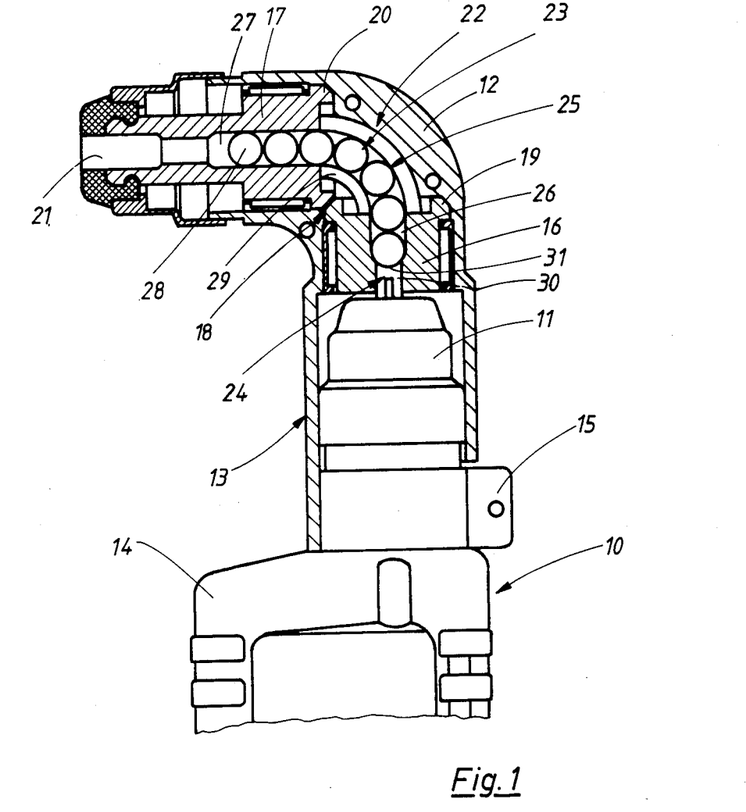
FIG. 1 is a sectional side view of an embodiment of the angular attachment of this invention mounted on a hammer drill.

FIG. 1 illustrates an angular attachment for use in connection with rotary and percussive driving machines, in this example a hammer drill 10, to transmit and deviate the rotary and translatory movements of an output part 11 of the hammer drill. The central axes of the output part 11 of the drill 10 and of a work tool at the output 21 of the attachment form to an angle which in this example is 90°. The angular attachment includes an angular housing 12 which at one end is provided with a mounting adaptor 13 insertable on housing 14 of the power machine 10 and enclosing the driven or output part 11 of the machine. The mounting adaptor 13 is secured to the machine housing 14 by a clamping device 15. A branch of the attachment housing 12 immediately adjacent the mounting adaptor 13 supports for rotation a rotary power input member 16. The other branch of the housing 12 supports for rotation a rotary power output member 17. The power input member 16 is coupled to the output part 11 of the hammer drill 10 in such a manner that the rotary movement of the latter is transmitted to the member 16. The power input member 16 and the power output member 17 are coupled by an intermediate power transmission 18 consisting of two bevel gears 19 and 20, each being integral with the corresponding power input member 16 and power output member 17. The power output member 17 is provided at its free end with a tool holder 21 into which a non-illustrated striking and drilling work tool is inserted in such a manner that it is connected for joint rotation with the member 17 but at the same time it is free to perform an axial movement in opposite directions.

In the intermediate stage of the housing between the power input member 16 and the power output member 17 there is arranged a percussion transmitting device 22 including at least one impact transmitting member 23. At the input side, the member 23 engages a coupling element 24 which is connected to a non-illustrated striking piston of the hammer drill 10. At the output side, the impact transmitting member 23 engages a non-illustrated work tool. In this example, the percussion or impact transmitting device includes a curved guiding track 25 in the form of a torroidal quadrant which communicates at its ends with axial bores 26 and 27 of power input and output members 16 and 17. The axial bore 26 in power input member 16 serves also as a guide for the axially movable coupling element 24. One end of the element 24 is connected for joint rotation with the power input member 16 and the other end thereof is shaped such as to fit the tool receptacle of the power output mechanism 11 of the hammer drill 10.

In the example of FIG. 1, the percussion transmitting device 22 includes a series of steel balls 28 which are freely shiftable in the curved guiding track 25 and in the axial bores 26 and 27. The guiding track 25 is assembled of two half-shells 29 of which only the lower half shell is illustrated in the drawings. Both the half shells 29 and the balls 28 are made of hardened steel. Instead of balls 28 it is possible also to employ steel rollers in which case the guiding track 25 has rectangular cross-section. In this example, the coupling element 24 is in the form of a plunger 30 whose end face is shaped with a concave recess to match the spherical surface of a ball 28 or of a cylindrical roller. Percussions generated by striking piston of the hammer drill 10 are transmitted via the plunger 30 and the balls 28 immediately to a work tool inserted in a tool holder at the output end of the angular attachment. Accordingly, during the rotary movement of the power output mechanism 11 of the hammer drill 10, the plunger 30 rotates synchronously with the power input member 16, the rotary movement is transmitted by the intermediate transmission 18 to the power output member 17 and to the work tool. At the same time percussions are transmitted to the work tool in the afore-described manner.

Figure 2:
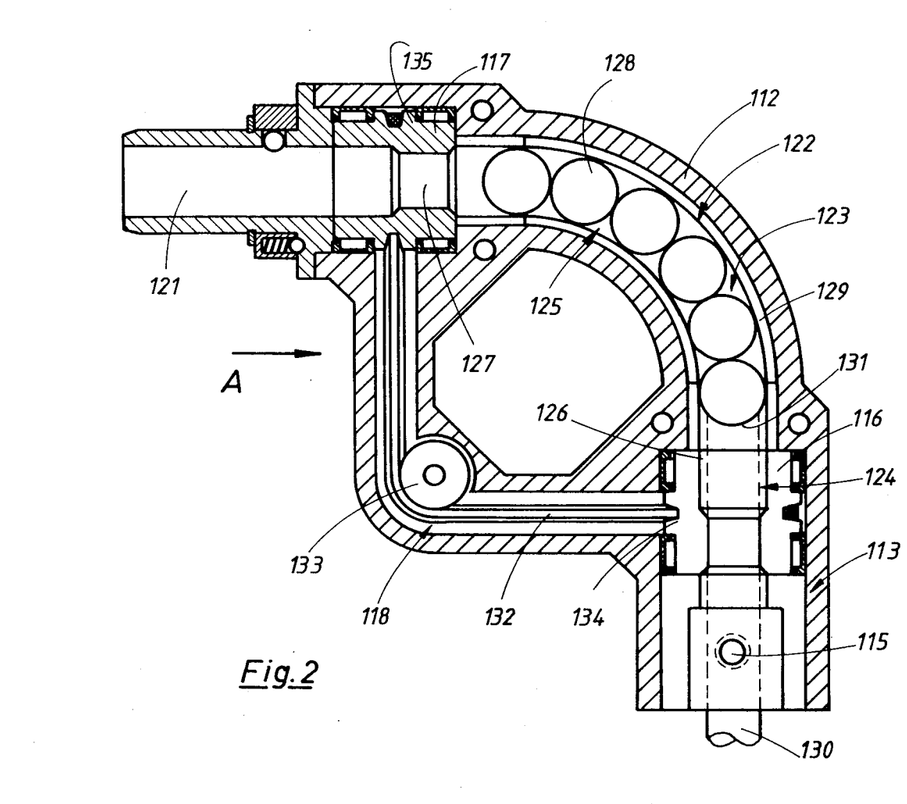
FIG. 2 is a sectional side view of another embodiment of the angular attachment.
Figure 3:
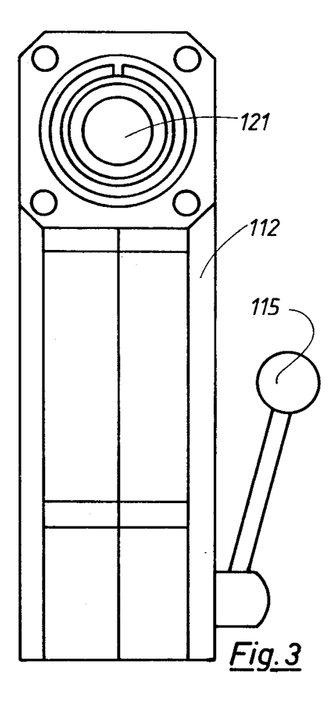
FIG. 3 is an elevation view of the angular attachment of FIG. 2 taken along the arrow A.

In another embodiment of this invention illustrated in FIGS. 2 and 3, the angular attachment is designed for use in connection with larger driving machines for example for 6 to 12 kg hammer drills. In principle, the construction of this angular attachment corresponds to that of FIG. 1 whereby like component parts are designated by corresponding last two digits (preceded by 1) in the reference, numerals. An essential difference of this embodiment with respect to FIG. 1 is in the provision of an enlarged intermediate space or housing 112 between the power input member 116 and power output member 117, and in the construction of the intermediate transmission 118 as a V-belt drive. The V-belt 132 in the transmission engages a circumferential groove 134 in the cylindrical jacket of the rotary power input member 116 and is deviated at right angles by a deviation roller 133 to engage a circumferential groove 135 in the cylindrical jacket of the power output roller 117. The deviation roller 133 serves simultaneously as a tensioning mechanism for the belt. Preferably, the housing 112 of the angular attachment is designed such that it serves simultaneously as a holding and pressing handle of the percussive drilling machine. Similarly as in the preceding example, the housing is provided with a mounting adaptor 113 having a clamping device 115 for clamping the whole adaptor on the front end of the housing of the hammer drill. Percussions from the striking piston or intermediate piston of the hammer drill are transmitted to the work tool through a sequence of steel balls 128 guided in curved track 125 of the impact transmitting device 122. The coupling member 124 is constructed as a cylindrical plunger 130 engaging the first ball by its arched end face 131. A work tool inserted in the tool holder 121 can be designed to engage directly the last impact transmitting ball 128 or to engage the latter by means of an intermediate coupling element in the axial output bore 127. In a modification of this embodiment, the V-belt can be replaced by a tube belt, a string of balls or a chain drive with correspondingly adjusted input and output members 116 and 117.

Figure 4:
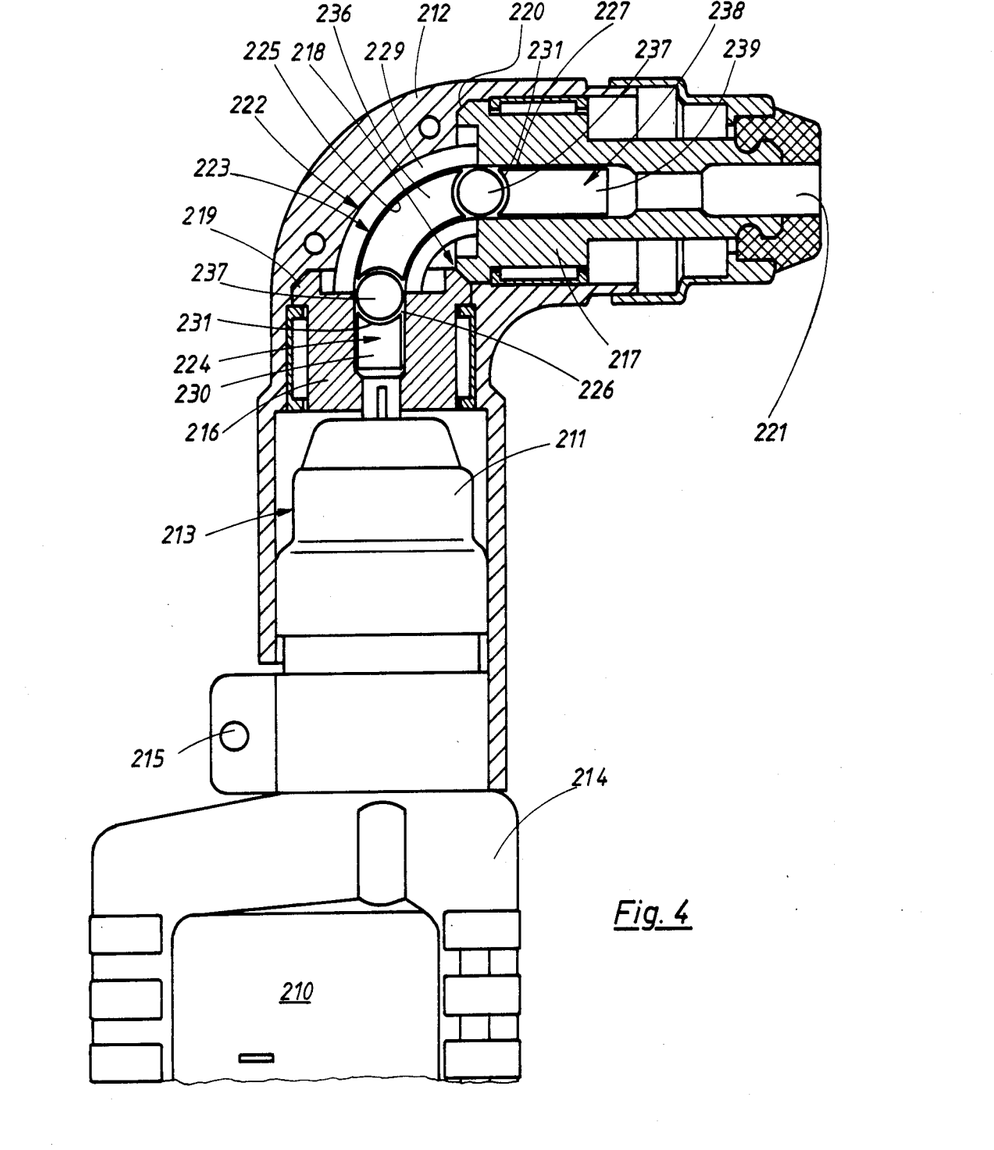
FIGS. 4 through 9 show respectively sectional side views of further modifications of the attachment of this invention.

The angular attachment in the embodiment according to FIG. 4 corresponds in structure to that in FIG. 1 except the different transmitting element 223 in the impact transmitting device 222.

Accordingly, to designate similar component parts, the last two digits in reference numerals of FIG. 4 correspond to reference numerals in the embodiment of FIG. 1 (preceded by 2). The attachment again uses a curved guiding track 225 in which the impact transmitting element is in the form of an elbow plunger 223 whose curvature corresponds to the curved track. The elbow plunger engages two steel balls 227 arranged at the ends of axial bores 226 and 227 of the rotary power input and output members 216 and 217. The two axial bores form with one another an angle of 90° and guide the coupling elements 224 and 238. The coupling element 224 is arranged for joint rotation with the input member 216 and is inserted in the output tool holder of the hammer drill 210. The coupling elements 238 in the form of a cylindrical plunger is free to move in the axial bore 227 independently on the rotation of the output member 217 and engages with its free end the work tool inserted in the tool holder 221 of the angular attachment. The operation of this embodiment is identical with the operation of the angular attachment of FIG. 1. The mounting adaptor 213 similarly as in the embodiments of FIGS. 1 and 2 permits to clamp the attachment in an arbitrary angular position on the housing 214 of the hammer drill 210.

Further exemplary embodiments of the angular attachment of this invention as illustrated in FIGS. 5 through 9 also differ from the examples of FIGS. 1 and 4 only in the construction of the percussion transmitting device. Accordingly, like component parts are designated by the same last two digits in the reference numerals. (preceded by 3).

Figure 5:
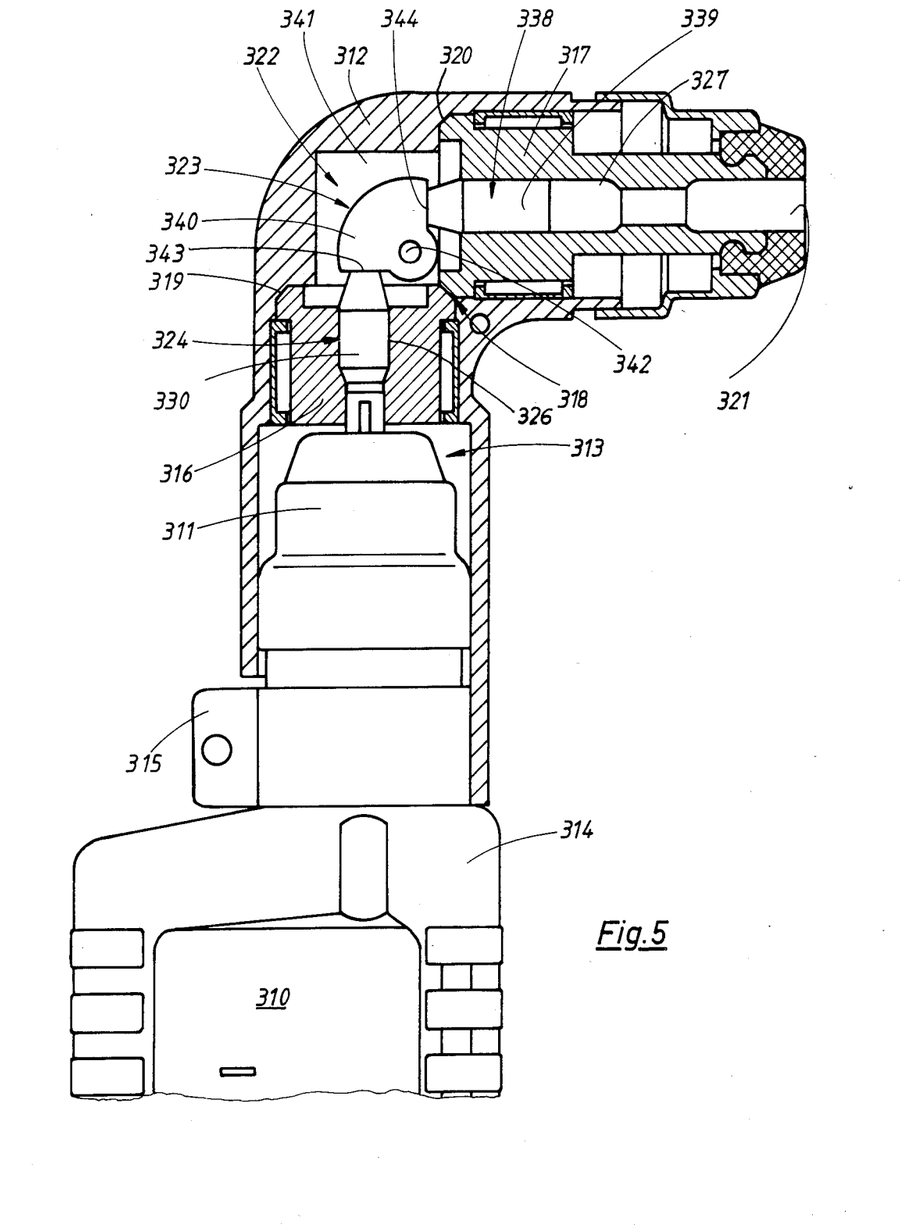

In the embodiment of FIG. 5 the impact transmitting member 323 of the transmitting device 322 is in the form of an angular lever or pendulum 340 which is supported for swinging movement about an axle 342 in a steel compartment 341 in the housing 312. The pendulum 340 has two sides 343 and 344 including a right angle with one another. The side 343 which extends at right angles to the axis of the power input member 316 engages a coupling element 324 arranged for axial movement in the axial bore 326 of the power input member 316. The other side 344 engages a coupling element 338 in the output axial bore 327 of the output member 317. Both coupling elements 324 and 338 are in the form of cylindrical plungers 330 and 339 cooperating with the striking piston of the hammer drill and with the work tool in the tool holder 321 in the same manner as described before. By adjusting the distance of points of intersection of the central axis of respective plungers 330 and 338 with the corresponding sides 343 and 344 of the pendulum 340, the transmission ratio can be adjusted within the range of the impact deviation, that is either an increased stroke or an increased force of the impact can be obtained at the output.

Figure 6:
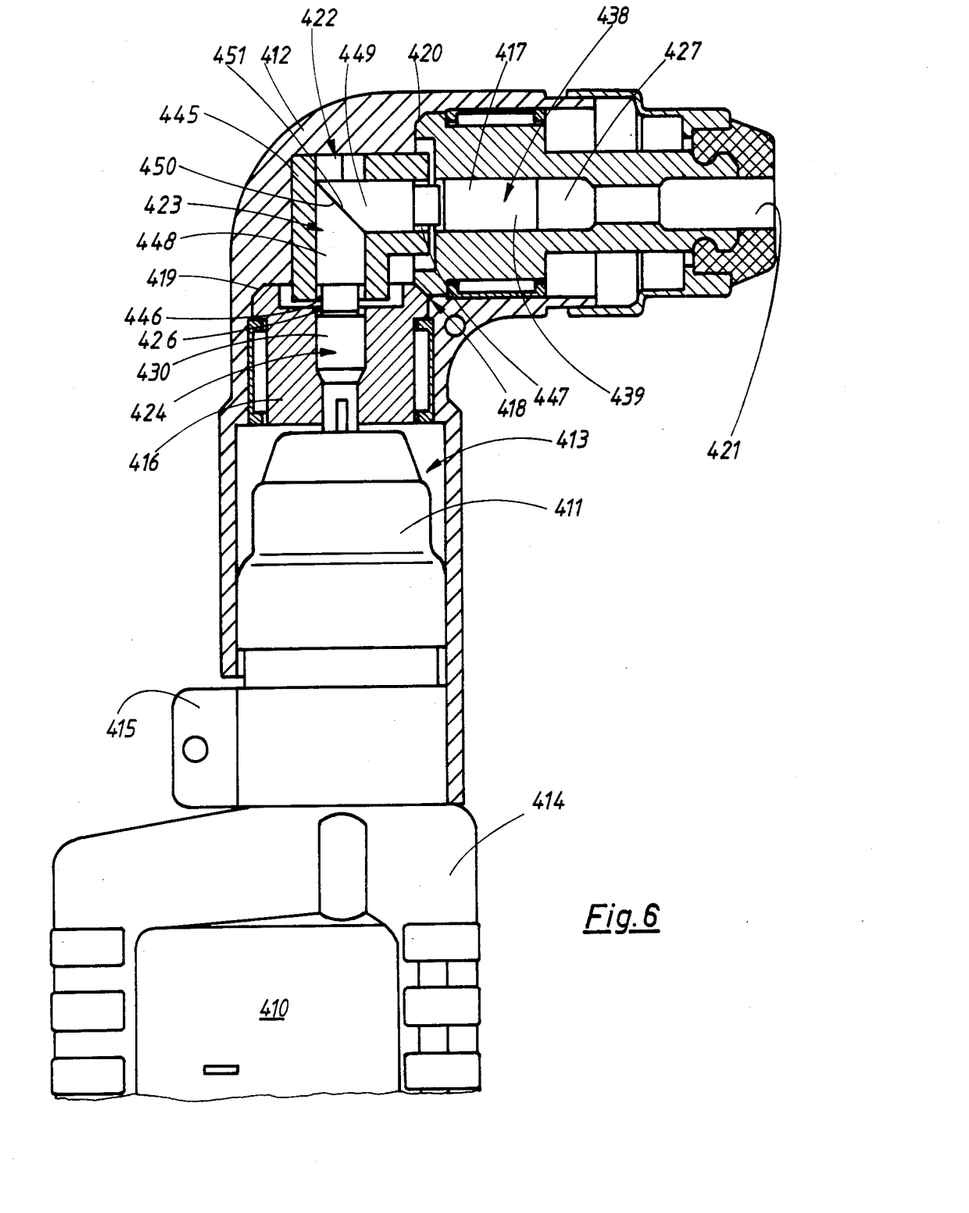

The impact transmitting device 422 of the angular attachment according to FIG. 6 has a rectangular guiding track 445 situated in the intermediate space of the attachment housing between the power input and output members 416 and 417. The rectangular guiding track includes two guiding channels 446 and 447 which are aligned with corresponding axial bores 426 and 427 of the input and output members. In this embodiment, the impact transmitting member 423 is assembled of two sliding elements 448 and 449 arranged for sliding movement in axial direction in the guiding channels 446 and 447. The two sliding elements 448 and 449 engage one another along the interface of sloping surfaces 450 and 451 forming an angle of 45° with the jacket of the corresponding sliding element. Similarly as in the preceding examples, the percussive movement of the hammer drill 410 is transmitted immediately via a plunger 430 acting as a coupling element 424 onto the sliding element 448. The impact is transmitted through the mating inclined surfaces 450 451 into the sliding element 449 which at its opposite end engages a coupling element 438 in the form of a plunger 439 through which percussions are applied to a work tool in the holder 421. Also in this case by providing inclined surfaces 450 and 451 of different size, the transmission ratio of the stroke or of the force of impact can be adjusted.

Figure 7:
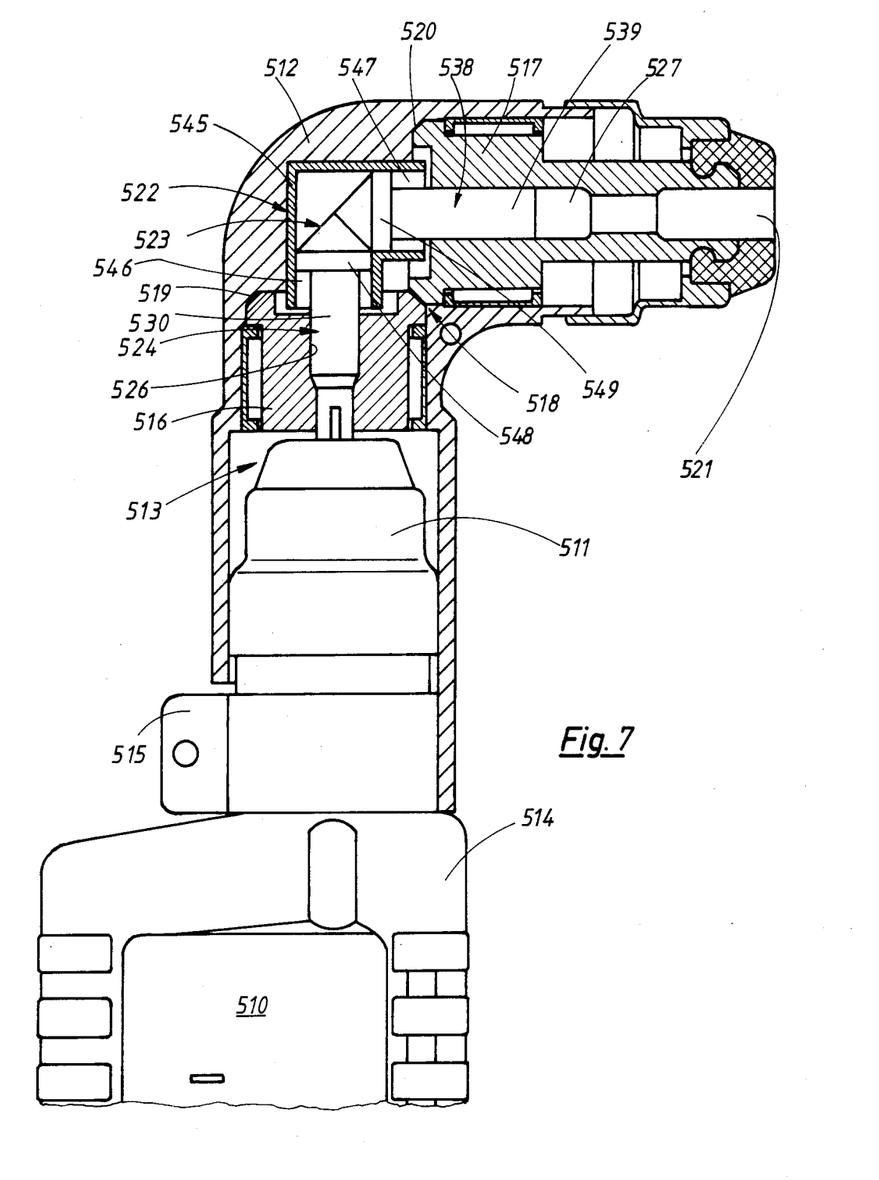
Figure 8:
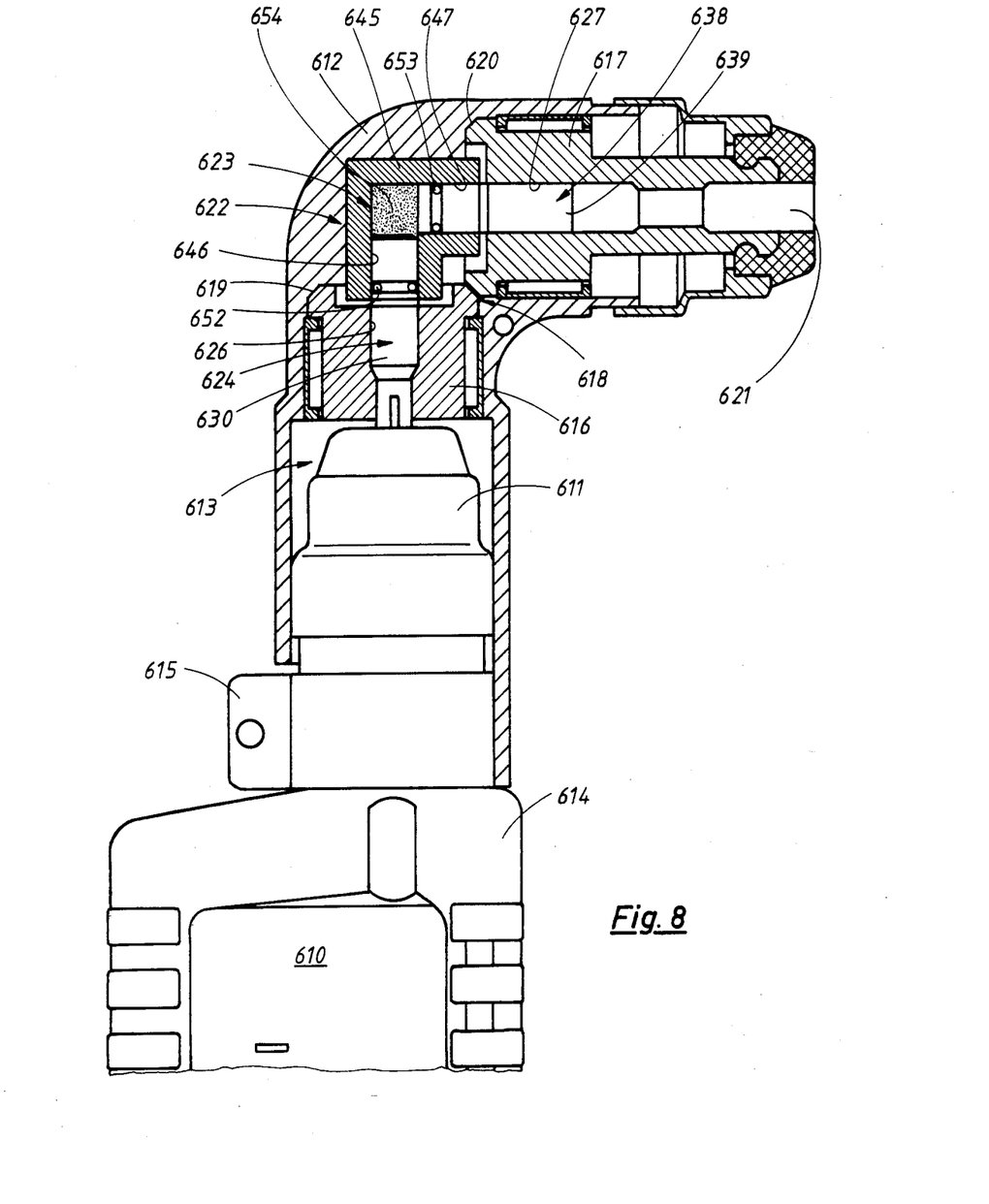

The percussion transmitting device 522 in the embodiment of angular attachment according to FIG. 7 has also a rectangular guiding track 545 having two branches or guiding channels 546 and 547 in alignment with axial bores of input and output members 516 and 517. Coupling elements 524 and 538 in the form of cylindrical plungers 530 and 539 are integrally connected at their ends with sliding elements 548 and 549 slidably guided in the guiding channels 546 and 547 of the angular track. The power input member 516 and the coupling plunger 530 are connected for joint rotation whereas the other coupling plunger 539 is freely rotatable in the axial bore 527. The top side of each sliding element 548 and 549 is in the form of a rotation symmetrical cone whereby the conical jackets of both sliding elements adjoin each other along a line forming an angle of 45° to its base. Since the input coupling plunger 530 is forcibly rotated by the power output member 511 of the hammer drill 510 while the other coupling plunger 539 is freely rotatable about its axis, it is achieved that different lines of contact between the conical jackets of power transmitting elements 523 are brought into engagement during the operation of the machine and therefore different portions of the contact surfaces are subjected to the impacts. As a result the service life of the impact transmitting elements is substantially prolongated.

The percussion transmitting device 622 in the angular attachment according to FIG. 8 has again an angular guiding track 645 with two guiding channels 646 and 647 forming a right angle and being aligned with axial bores 626 and 627 of respective input and output rotary members 616 and 617. The coupling elements 624 and 638 are axially shiftable in respective axial bores. Both coupling elements are again in the form of cylindrical plungers 630 and 639. The coupling elements are sealed against the inner walls of respective axial bores by gaskets or O-rings 652 and 653. The ends of the coupling elements delimit with the inner wall of the rectangular track a chamber which is filled with an incompressible medium 654 which takes up only minute shearing forces. For example, the medium 654 can be a hydraulic liquid, grease, graphite paste and the like. This incompressible medium 654 thus constitutes the impact transmitting element 623 operating in the manner of a hydraulic press which deviates the direction of impact of the striking plunger of the hammer drill.

Instead of solid coupling elements 624 and 638 it is possible to use articulated sliding elements arranged in the guiding channels of the angular track and in the corresponding axial bores of input and output members and engaging each other along their opposite end faces.

Figures 9, 10:
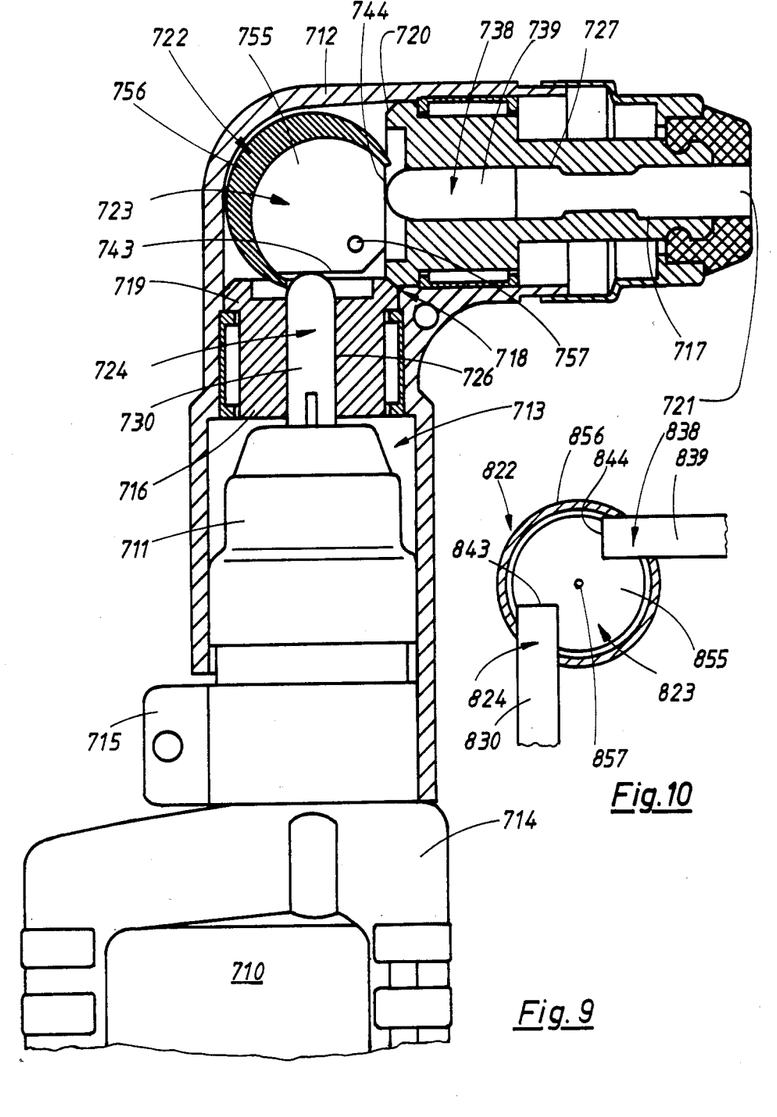
FIG. 10 is a variation of the impact transmitting device in the angular attachment of FIG. 9.

In the embodiment according to FIG. 9, the impact transmitting member 723 of the percussion transmitting device 722 is constructed as a disc-shaped segment 755 which is guided for rotation in a cylindrical space 756. The rotary guidance of the segment 755 is accomplished by the sliding bearing between the cylindrical walls of this segment 755 and the guiding chamber 756. Instead of a sliding bearing it is also possible to use ball or needle bearings. The disc-shaped segment 755 has two abutment surfaces 743 and 744 which are spaced apart from the pivot point 757 of the segment 755 and in the inactive condition of the machine extend at right angles to the axes coupling elements 724 and 738. The latter elements are again arranged in the beforedescribed manner in axial bores 726 and 727 of input and output members 716 and 717. In the embodiment according to FIG. 9 the disc-shaped segment 755 and the guiding chamber 756 are arranged in such a way with respect to coupling elements 724 and 738 that the axes of the coupling elements intersect at the center of the guiding chamber whereby the pivot point 757 of the disc segment is radially offset from the center of the chamber. In a modification of the impact transmitting 823 according to FIG. 10, the guiding chamber and the disc segment are arranged in such a way that the pivot point of the disc segment coincides with the center of the guide chamber whereas the abutment surfaces opposite the faces of coupling elements 824 and 838 are spaced apart from parallel planes passing through the common center of the chamber and of the disc segment. The coupling elements which are again in the form of cylindrical plungers 730 and 739 or 830 and 839 engage the disc 855 at a distance from its center point and consequently a lever action is achieved.

The advantages of the percussion transmitting device 722 or 822 according to FIGS. 9 and 10 resides particularly in a simple manufacture and a stable construction inasmuch as the guiding chambers 756 and 856 can be simply produced from a pipe and the disc-shaped members from round rods. The long sliding surfaces between the cylindrical surfaces of the guiding chamber 756 or 856 and the disc-shaped element 755 or 855 guarantee a reliable guidance at a minute wear.

Figure 11:
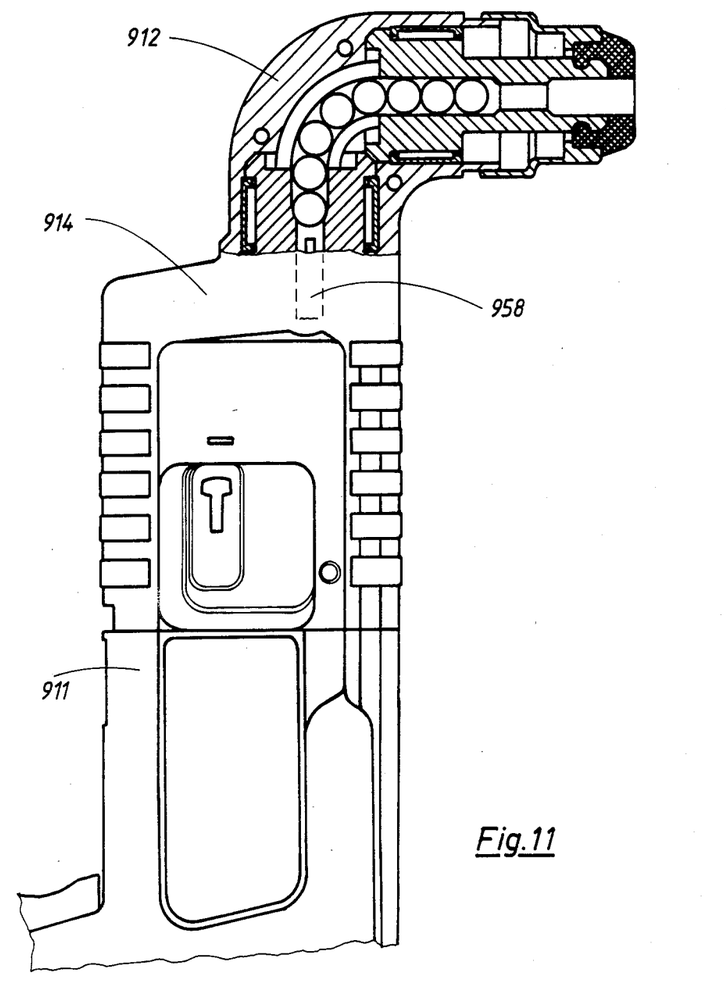
FIG. 11 is a side view, partly in section, of a hand-operated hammer drill equipped with an angular attachment of this invention.

FIG. 11 shows a hand-operated hand drill 910 which is integrally (non-detachably) connected with the angular attachment of this invention. The attachment corresponds exactly to the embodiment of FIG. 1 with the exception that its housing 912 is an integral part of the housing 914 of the hammer drill. Preferably, the coupling element 24 is directly connected with the percussion member 958 (intermediate piston) of the hammer drill 910. It will be understood that the integrated angular attachment can be constructed also in accordance with further embodiments illustrated in FIGS. 2 through 10.

While the invention has been illustrated and described as embodied in connection with a hammer drill, it is not intended to be limited to the details shown, since various modifications and structural changes may be made without departing in any way from the spirit of the present invention. For example, the angular attachment can be also used for riveting hammers or knurling machines, percussion drilling machines and the like. Also the guiding tracks 25 or 125 in the embodiments in FIGS. 1 and 2 can be constructed with different cross-sections assembled for example of half shells, of U-shaped or prismatic cross-sections or having a C-shaped profile with a cover plate.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An angular attachment for transmitting and deviating output power of a rotary and percussive power machine, such as a percussive boring machine or a hammer drill, having a rotary power output means provided with an axially movable striking member, the attachment comprising a rotary power input member arranged for rotation about a first axis and being coupled to said rotary power output means; a rotary power output member arranged for rotation about a second axis forming an angle with said first axis and being provided with means for receiving a work too; and intermediate power transmission arranged between said rotary input and output members, said power transmission including means for transmitting rotary movement from said input member to said output member and means for transmitting impacts from said striking member to said work tool, said impact transmitting means consisting of two impact deviating elements both movably guided for movement between said input and output members, said impact deviating elements slidably engaging each other, and being coupled from different directions to said striking member and to said work tool.

2. An angular attachment as defined in claim 1, wherein said power input member has an axial input bore aligned with the path of movement of said striking member, said power output member having an axial output bore for receiving a work tool, and said coupling elements being arranged for axial displacement in said axial input and output bores and engaging at right angles said impact deviating elements.

3. An angular attachment as defined in claim 2, wherein the coupling element in said axial input bore is connected for joint rotation with said rotary power input member, and the power output member being connected to a tool holder, the coupling element in said axial output bore projecting into said tool holder.

4. An angular attachment as defined in claim 3, wherein said impact transmitting means includes a bent guiding track arranged between said axial input and output bores to guide said at least one impact deviating element.

5. An angular attachment as defined in claim 4, comprising a housing supporting for rotation said power input and output members, said intermediate transmission, and a fixed guiding track.

6. An angular attachment as defined in claim 5, wherein said guiding track is assembled of two half shells of hardened steel.

7. An angular attachment as defined in claim 5, wherein said housing is provided with a mounting adaptor for receiving a part of a housing of said rotary and percussive power machine and means for clamping the mounting adaptor to the latter housing.

8. A rotary and percussive power machine having a machine housing integrally connected to the housing of the angular attachment according to claim 5.

9. An angular attachment as defined in claim 4, wherein said guiding track is in the form of a housing having two guiding channels forming a right angle and being aligned respectively with said axial input and output bores, said impact deviating elements being in the form of two sliding members each arranged for movement in one of said guiding channels and each engaging at one end thereof the corresponding coupling element, the sliding members slidably engaging each other at the opposite ends thereof along an interface which is inclined relative to their direction of movement.

10. An angular attachment as defined in claim 9, wherein said interface is formed by mating inclined surfaces at other ends of respective sliding members.

* * * * *